United States Patent
Chen et al.

(10) Patent No.: US 11,784,490 B2
(45) Date of Patent: Oct. 10, 2023

(54) METHOD AND SYSTEM FOR SWITCHING FROM GRID-CONNECTED TO GRID-DISCONNECTED AND POWER CONVERSION SYSTEM

(71) Applicants: KEHUA HENGSHENG CO., LTD., Fujian (CN); ZHANGZHOU KEHUA TECHNOLOGY CO., LTD., Fujian (CN)

(72) Inventors: Haisen Chen, Fujian (CN); Chunbao Zeng, Fujian (CN); Baoshuai Jiao, Fujian (CN); Binbin Lin, Fujian (CN); Xi Chen, Fujian (CN)

(73) Assignees: KEHUA HENGSHENG CO., LTD., Fujian (CN); ZHANGZHOU KEHUA TECHNOLOGY CO., LTD., Fujian (CN)

( * ) Notice: Subject to any disclaimer, the term of this patent is extended or adjusted under 35 U.S.C. 154(b) by 409 days.

(21) Appl. No.: 17/257,325

(22) PCT Filed: Dec. 7, 2020

(86) PCT No.: PCT/CN2020/134195
§ 371 (c)(1),
(2) Date: Dec. 31, 2020

(87) PCT Pub. No.: WO2021/135834
PCT Pub. Date: Jul. 8, 2021

(65) Prior Publication Data
US 2022/0329070 A1    Oct. 13, 2022

(30) Foreign Application Priority Data
Dec. 31, 2019   (CN) .......................... 201911421887.0

(51) Int. Cl.
*H02J 3/00*       (2006.01)
*G05B 19/042*  (2006.01)

(52) U.S. Cl.
CPC ............ *H02J 3/007* (2020.01); *G05B 19/042* (2013.01); *H02J 3/0012* (2020.01); *G05B 2219/2639* (2013.01)

(58) Field of Classification Search
CPC .......... H02J 3/007; H02J 3/0012; H02J 3/001; H02J 3/388; H02J 3/38; G05B 19/042; G05B 2219/2639

(Continued)

(56) References Cited

U.S. PATENT DOCUMENTS 8,310,105 B2 *  11/2012  West ....................... H02J 3/381
                                                                    307/87
9,496,717 B2 *  11/2016  Rasmussen ............... H02J 3/50

(Continued)

FOREIGN PATENT DOCUMENTS

CN     102185341 A    9/2011
CN     103311940 A    9/2013

(Continued)

OTHER PUBLICATIONS

International Search Report and Written Opinion of the International Searching Authority dated Mar. 8, 2021 for PCT/CN2020/134195.

(Continued)

*Primary Examiner* — Richard Tan
(74) *Attorney, Agent, or Firm* — Yue (Robert) Xu; Apex Attorneys at Law, LLP (57) ABSTRACT

A method and a system for switching from grid-connected to grid-disconnected, and a power conversion system are provided. The method includes determining whether a power grid is abnormal based on a power grid parameter obtained (Continued)

when a PCS is grid-connected and operates in a current source mode, turning off a switching cabinet if the power grid is abnormal, switching from a current source mode to a voltage source mode, sending a command to instruct a grid-connected/grid-disconnected switch to switch from a grid-connected loop to a grid-disconnected loop, controlling an output parameter to smoothly transit from an abnormal parameter value recorded when the power grid is abnormal to a rated parameter value, and supplying power to a load according to the rated parameter value. In this way, seamless switching from grid-connected to grid-disconnected can be achieved, thereby ensuring stability of power supply.

14 Claims, 4 Drawing Sheets

(58) Field of Classification Search
USPC .......................................................... 307/38
See application file for complete search history.

(56) References Cited

U.S. PATENT DOCUMENTS

| 2013/0201737 A1 | 8/2013 | Chiang et al. |
| 2017/0194793 A1 | 7/2017 | Jiang et al. |
| 2018/0269819 A1 | 9/2018 | Tuckey et al. |

FOREIGN PATENT DOCUMENTS

| CN | 103647286 A | 3/2014 |
| CN | 104201706 A | 12/2014 |
| CN | 104242330 A | 12/2014 |
| CN | 105391097 A | 3/2016 |
| CN | 105576697 A | 5/2016 |
| CN | 105762829 A | 7/2016 |
| CN | 107465211 A | 12/2017 |
| CN | 110994689 A | 4/2020 |

OTHER PUBLICATIONS

The 1st Office Action dated Feb. 3, 2021 for the Chinese Patent Application No. CN201911421887.0,English Translation Provided by http://globaldossier.uspto.gov.
Weiguo Hao, Operation and control specification for microgrids connected to distribution network. GB/T 34930-2017, Nov. 1, 2017.

* cited by examiner

METHOD AND SYSTEM FOR SWITCHING FROM GRID-CONNECTED TO GRID-DISCONNECTED AND POWER CONVERSION SYSTEM

The present application is the U.S. national phase of International Patent Application No. PCT/CN2020/134195, titled "METHOD AND SYSTEM FOR SWITCHING FROM GRID-CONNECTED TO GRID-DISCONNECTED AND POWER CONVERSION SYSTEM", filed on Dec. 7, 2020, which claims priority to Chinese Patent Application No. 201911421887.0, titled "METHOD AND SYSTEM FOR SWITCHING FROM GRID-CONNECTED TO GRID-DISCONNECTED AND POWER CONVERSION SYSTEM", filed on Dec. 31, 2019, with the China National Intellectual Property Administration, both of which are incorporated herein by reference in their entirety.

FIELD

The present disclosure relates to the technical field of power grids, and in particular to a method and a system for switching from grid-connected to grid-disconnected, and a power conversion system.

BACKGROUND

A power conversion system (PCS) can control charging and discharging of a storage battery, perform a conversion between alternating current and direct current, and directly supply power for an alternating current load without a power grid.

Currently, the power conversion system performs switching between grid-connected and grid-disconnected generally by means of droop control. However, with the method, a voltage amplitude and a voltage frequency will, in the presence of a load, vary with the load, resulting in instability of power supply.

SUMMARY

In view of this, a method and a system for switching from grid-connected to grid-disconnected, and a power conversion system are provided according to embodiments of the present disclosure, to solve the problem of instability of power supply that is caused by a voltage amplitude and a voltage frequency varying with a load when switching from grid-connected to grid-disconnected in the conventional technology.

A method for switching from grid-connected to grid-disconnected is provided according to a first aspect of the present disclosure, which is applied to a power conversion system. The power conversion system is connected with a first terminal of a switching cabinet and a load. A second terminal of the switching cabinet is connected with a power grid.

The method for switching from grid-connected to grid-disconnected includes:
- obtaining a power grid parameter when the power conversion system is grid-connected and operating in a current source mode, and determining whether the power grid is in an abnormal state based on the power grid parameter;
- recording a power grid parameter value at a time instant when the power grid is in an abnormal state as an abnormal parameter value, and sending a turn-off command to the switching cabinet, if it is determined that the power grid is in an abnormal state, where the turn-off command is used to instruct the switching cabinet to be turned off;
- switching from the current source mode to a voltage source mode, sending a switching command to a grid-connected/grid-disconnected switch, and determining a current loop given value as an initial value of a grid-disconnected loop, where the switching command is used to instruct the grid-connected/grid-disconnected switch to switch from a grid-connected loop to the grid-disconnected loop; and
- controlling an output parameter to smoothly transit from the abnormal parameter value to a rated parameter value, and supplying power to the load according to the rated parameter value.

A system for switching from grid-connected to grid-disconnected is provided according to a second aspect of the present disclosure, which is applied to a power conversion system. The power conversion system is connected with a first terminal of a switching cabinet and a load. A second terminal of the switching cabinet is connected with a power grid.

The system for switching from grid-connected to grid-disconnected includes a power grid abnormality determining module, an abnormal value recording module, a switching module and an output control module.

The power grid abnormality determining module is configured to obtain a power grid parameter when the power conversion system is grid-connected and operating in a current source mode, and determine whether the power grid is in an abnormal state based on the power grid parameter.

The abnormal value recording module is configured to record a power grid parameter value at a time instant when the power grid is in an abnormal state as an abnormal parameter value, and send a turn-off command to the switching cabinet, if it is determined that the power grid is in an abnormal state. The turn-off command is used to instruct the switching cabinet to be turned off.

The switching module is configured to switch from the current source mode to a voltage source mode, send a switching command to a grid-connected/grid-disconnected switch, and determine a current loop given value as an initial value of a grid-disconnected loop. The switching command is used to instruct the grid-connected/grid-disconnected switch to switch from a grid-connected loop to the grid-disconnected loop.

The output control module is configured to control an output parameter to smoothly transit from the abnormal parameter value to a rated parameter value, and supply power to the load according to the rated parameter value.

A power conversion system is provided according to a third aspect of the present disclosure. The power conversion system includes a memory, a processor and a computer program stored in the memory and capable of running on the processor. The processor is configured to execute the computer program to perform steps in the method for switching from grid-connected to grid-disconnected according to the first aspect.

A computer-readable storage medium is provided according to a fourth aspect of the present disclosure. The computer-readable storage medium stores a computer program. The computer program is executed by one or more processors to implement the steps in the method for switching from grid-connected to grid-disconnected according to the first aspect.

Compared with the conventional technology, the embodiments of the present disclosure have the following beneficial effects. According to embodiments of the present disclosure, in a case that the power grid is in an abnormal state, a connection between the power conversion system and the power grid is cut off, the power conversion system switches from the current source mode to the voltage source mode, the grid-connected/grid-disconnected switch is controlled to switch from the grid-connected loop to the grid-disconnected loop, the current loop given value is determined as the initial value of the grid-disconnected loop, finally the parameter of the power conversion system itself is controlled to smoothly transit from the abnormal parameter value to the rated parameter value, and power is supplied to the load according to the rated parameter value. In this way, seamless switching from grid-connected to grid-disconnected can be achieved. In addition, the power conversion system operates as a voltage source to supply power to the load in a case that the power grid is in the abnormal state. In the process of switching from grid-connected to grid-disconnected, switching between loops can be performed smoothly, which has less impact on the load, thereby ensuring stability of power supply.

BRIEF DESCRIPTION OF THE DRAWINGS

In order to illustrate technical solutions in embodiments of the present disclosure more clearly, drawings to be used in the description of the embodiments or the conventional technology are briefly described below. It is apparent that the drawings described below only illustrate some embodiments of the present disclosure, and other drawings may be obtained by those skilled in the art according to the provided drawings without any creative work.

DETAILED DESCRIPTION

In the following description, details such as a system structure and technology are provided for explanation rather than limitation, so as to thoroughly understand embodiments of the present disclosure. However, those skilled in the art should understand that the present disclosure may be implemented in other embodiments without these details. In other cases, well-known systems, devices, circuits, and methods are not described in detail so as to prevent unnecessary details from obscuring the description of the present disclosure.

The technical solutions of the present disclosure are described with reference to the following specific embodiments.

Figure 1:
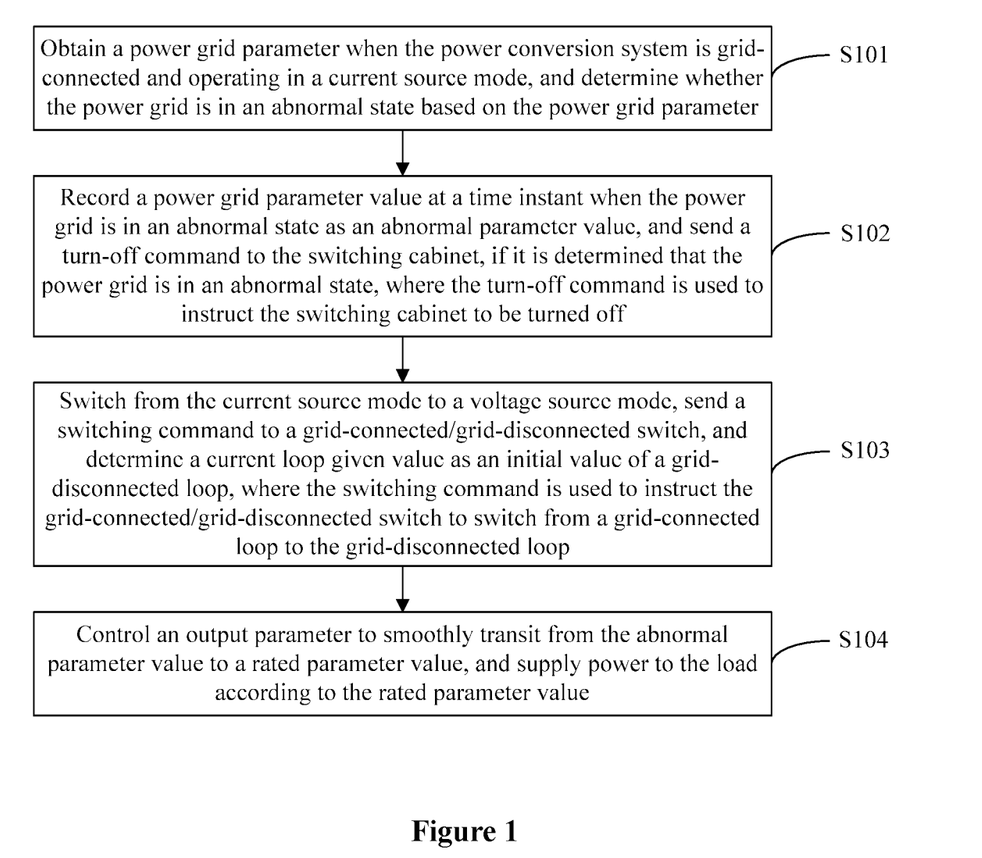
FIG. 1 is a schematic flowchart of a method for switching from grid-connected to grid-disconnected according to an embodiment of the present disclosure.

FIG. 1 is a schematic flowchart of a method for switching from grid-connected to grid-disconnected according to an embodiment of the present disclosure. In order to facilitate the description, only relevant part of the embodiment of the present disclosure is shown. A executor of the embodiment of the present disclosure may be a power conversion system.

Figure 2:
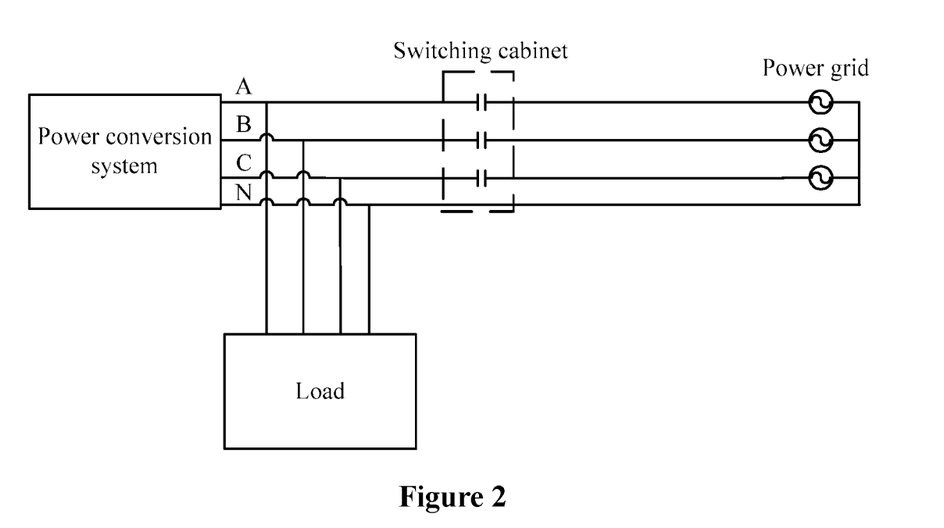
FIG. 2 is a schematic diagram showing connection with a power conversion system according to an embodiment of the present disclosure.

Referring to FIG. 2, the power conversion system is connected with a first terminal of a switching cabinet and a load, and a second terminal of the switching cabinet is connected with a power grid. The switching cabinet can turn on or turn off a connection between the power conversion system and the power grid. In a case that the power grid is in a normal power supply state, the switching cabinet is in a turned-on state, and the power grid supplies power to the load. In a case that the power grid is in an abnormal state, the switching cabinet is turned off, and the power conversion system supplies power to the load.

Figure 3:
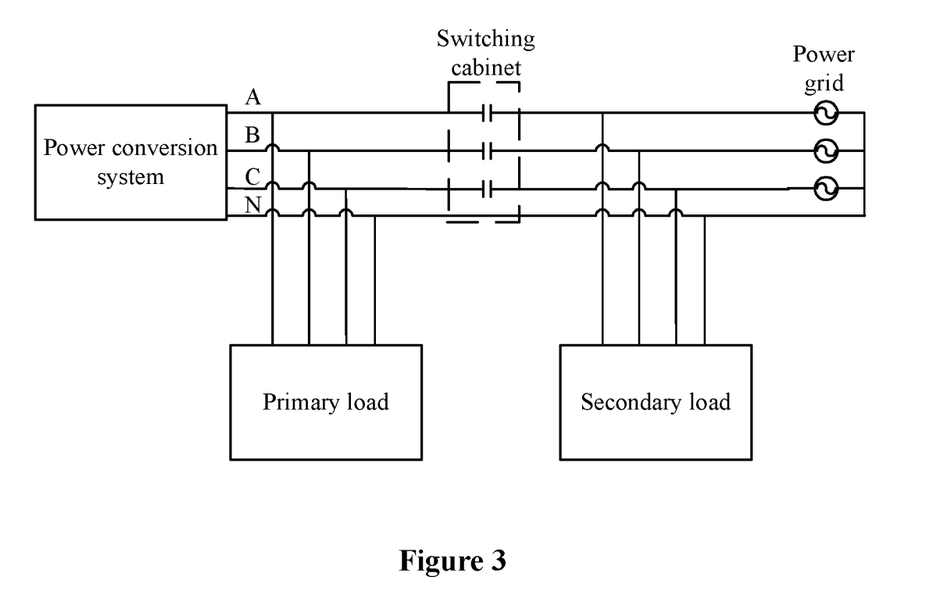
FIG. 3 is another schematic diagram showing connection with a power conversion system according to an embodiment of the present disclosure.

Optionally, referring to FIG. 3, the power conversion system may alternatively be connected with a first terminal of the switching cabinet and a primary load, and the second terminal of the switching cabinet may be connected with a secondary load and the power grid. The secondary load is connected with the power grid. In a case that the power grid is in a normal power supply state, the switching cabinet is in a turned-on state, and the power grid supplies power to the primary load and the secondary load. In a case that the power grid is in an abnormal state, the switching cabinet is turned off, and the power conversion system supplies power to the primary load. Thus, the primary load can always be normally supplied with power.

As shown in FIG. 1, the method includes the following steps S101 to S104.

In step S101, a power grid parameter when the power conversion system is grid-connected and operating in a current source mode is obtained, and it is determined whether the power grid is in an abnormal state based on the power grid parameter.

In a case that the power grid is in a normal power supply state, the power conversion system operates in a current source mode. The power grid parameter is obtained in real time when the power conversion system is in grid-connected operation in the current source mode, and it is determined in real time whether the power grid is in an abnormal state based on the power grid parameter. If it is determined that the power grid is in a normal power supply state, the determination as to whether the power grid is in an abnormal state is continued based on a power grid parameter obtained in real time. If it is determined that the power grid is in an abnormal state, step S102 is performed.

In an embodiment of the present disclosure, the power grid parameter includes a power grid voltage and a power grid frequency.

Determining whether the power grid is in an abnormal state based on the power grid parameter in the above step S101 may include the following steps:

if the power grid voltage is outside a preset voltage range or the power grid frequency is outside a preset frequency range, determining that the power grid is in an abnormal state; and if the power grid voltage is within the preset voltage range and the power grid frequency is within the preset frequency range, determining that the power grid is in a normal state.

Specifically, it is determined whether the power grid is in an abnormal state based on the power grid voltage and the power grid frequency. If the power grid voltage is not within the preset voltage range or the power grid frequency is not within the preset frequency range, that is, either of the grid voltage and the grid frequency is not within a corresponding preset range, it is determined that the power grid is in an abnormal state. If both the power grid voltage and the power grid frequency are within their respective preset ranges, it is determined that the power grid is in a normal power supply state.

The preset voltage range and the preset frequency range may be set based on actual requirements.

In step S102, if it is determined that the power grid is in an abnormal state, a power grid parameter value at a time instant when the power grid is in the abnormal state is recorded as an abnormal parameter value, and a turn-off command is sent to the switching cabinet. The turn-off command is used to instruct the switching cabinet to be turned off.

If it is determined that the power grid is in an abnormal state, the power conversion system may record a power grid parameter value at a time instant when the power grid is in the abnormal state as an abnormal parameter value, and control the switching cabinet to be turned off, to switch from the connection with the power grid.

In step S103, a voltage source mode is switched to from the current source mode, a switching command is sent to a grid-connected/grid-disconnected switch, and a current loop given value is determined as an initial value of a grid-disconnected loop. The switching command is used to instruct the grid-connected/grid-disconnected switch to switch from a grid-connected loop to the grid-disconnected loop.

Figure 4:
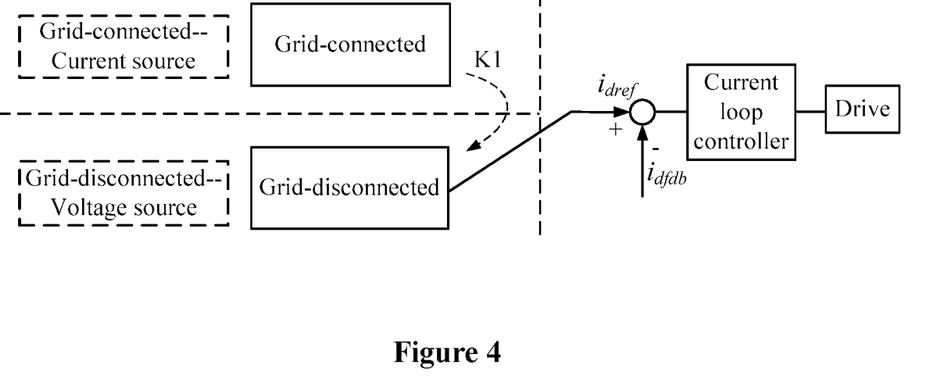
FIG. 4 is a schematic diagram showing switching from a grid-connected loop to a grid-disconnected loop according to an embodiment of the present disclosure.

Referring to FIG. 4, the power conversion system switches from the current source mode to a voltage source mode, controls a grid-connected/grid-disconnected switch K1 to switch from a grid-connected loop to the grid-disconnected loop, and determines a current loop given value $i_{dref}$ as an initial value of the grid-disconnected loop.

In step S104, an output parameter is controlled to smoothly transit from the abnormal parameter value to a rated parameter value, and power is supplied to the load according to the rated parameter value.

The power conversion system controls the output parameter of the power conversion system itself to smoothly transit from the abnormal parameter value to a rated parameter value after controlling the grid-connected/grid-disconnected switch K1 to switch from the grid-connected loop to the grid-disconnected loop, and supplies power to the load according to the rated parameter value. The rated parameter value is a preset parameter value.

In an embodiment of the present disclosure, the output parameter includes an output voltage and an output frequency, the abnormal parameter value includes an abnormal voltage value and an abnormal frequency value, and the rated parameter value includes a rated voltage value and a rated frequency value.

Controlling the output parameter to smoothly transit from the abnormal parameter value to the rated parameter value in the above step S104 may include the following steps:
  controlling the output voltage to smoothly transit from the abnormal voltage value to the rated voltage value in a first preset time period according to a first formula; and
  controlling the output frequency to smoothly transit from the abnormal frequency value to the rated frequency value in a second preset time period according to a second formula.

In an embodiment of the present disclosure, the first formula is:

$$V = \begin{cases} V_0 + \dfrac{V_{rate} - V_0}{T_0} t & (t \le T_0) \\ V_{rate} & (t > T_0) \end{cases}.$$

$V_0$ is the abnormal voltage value, $V_{rate}$ is the rated voltage value, $T_0$ is the first preset time period, t is a time length from a start time instant of the first preset time period to a current time instant, and V is an output voltage at the current time instant.

In an embodiment of the present disclosure, the second formula is:

$$f = \begin{cases} f_0 + \dfrac{f_{rate} - f_0}{T_1} t & (t \le T_1) \\ f_{rate} & (t > T_1) \end{cases}.$$

$f_0$ is the abnormal frequency value, $f_{rate}$ is the rated frequency value, $T_1$ is the second preset time period, t is a time length from a start time instant of the second preset time period to a current time instant, where the start time instant of the second preset time period is the same as the start time instant of the first preset time period, and f is an output frequency at the current time instant.

Specifically, the power conversion system may simultaneously control the output voltage to smoothly transit from the abnormal voltage value to the rated voltage value in the first preset time period, and the output frequency to smoothly transit from the abnormal frequency value to the rated frequency value in the second preset time period. The second preset time period and the first preset time period may be same or different, which may be set based on actual requirements. The start time instant of the first preset time period may be the same as the start time instant of the second preset time period, that is, the output voltage and the output frequency may be simultaneously controlled.

It can be seen from the above description that, in switching from grid-connected to grid-disconnected according to the embodiments of the present disclosure, the current loop given value is determined as the initial value of the grid-disconnected loop, and the output parameter of the power conversion system itself is controlled to smoothly transit from the abnormal parameter value to the rated parameter value, and power is supplied to the load according to the rated parameter value. In this way, seamless switching from grid-connected to grid-disconnected can be achieved. In addition, when the power grid is in an abnormal state, the power conversion system operates as a voltage source mode to supply power to the load. The switching from grid-connected to grid-disconnected is completely controlled by the power conversion system without additional devices. In the process of switching from grid-connected to grid-disconnected, smooth switching between loops can be achieved, which has less impact on the load, thereby ensuring stability of power supply.

It should be understood that serial numbers of the steps in the above embodiments do not represent a performing sequence. The performing sequence of each process is determined based on the function and internal logic thereof, which is not intended to limit implementation of the embodiments of the present disclosure.

Figure 5:
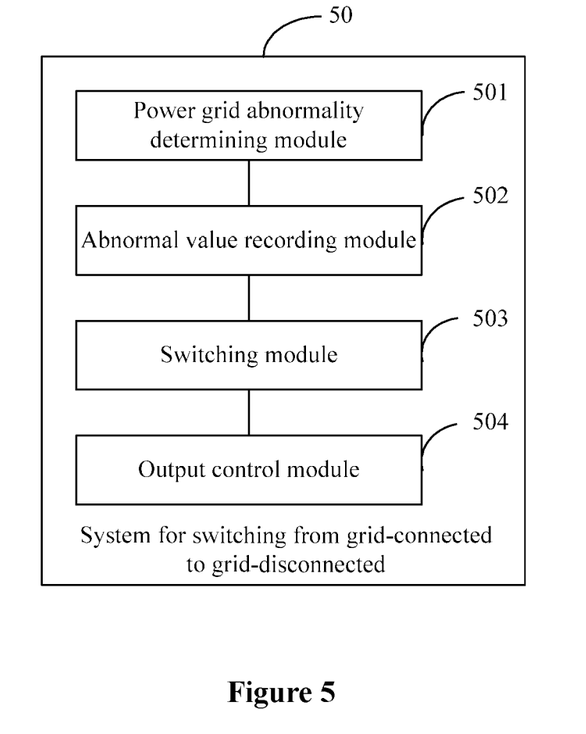
FIG. 5 is a schematic block diagram of a system for switching from grid-connected to grid-disconnected according to an embodiment of the present disclosure.

FIG. 5 is a schematic block diagram of a system for switching from grid-connected to grid-disconnected according to an embodiment of the present disclosure. For convenience of description, FIG. 5 only illustrates parts related to the embodiment of the present disclosure. The system is applied to a power conversion system. The power conversion system is connected with a first terminal of a switching cabinet and a load. A second terminal of the switching cabinet is connected with a power grid.

A system 50 for switching from grid-connected to grid-disconnected may include a power grid abnormality determining module 501, an abnormal value recording module 502, a switching module 503 and an output control module 504.

The power grid abnormality determining module 501 is configured to obtain a power grid parameter when the power conversion system is grid-connected and operating in a current source mode, and determine whether the power grid is in an abnormal state based on the power grid parameter.

The abnormal value recording module 502 is configured to record a power grid parameter value at a time instant when the power grid is in an abnormal state as an abnormal parameter value, and send a turn-off command to the switching cabinet, if it is determined that the power grid is in an abnormal state. The turn-off command is used to instruct the switching cabinet to be turned off.

The switching module 503 is configured to switch from the current source mode to a voltage source mode, send a switching command to a grid-connected/grid-disconnected switch, and determine a current loop given value as an initial value of a grid-disconnected loop. The switching command is used to instruct the grid-connected/grid-disconnected switch to switch from a grid-connected loop to the grid-disconnected loop.

The output control module 504 is configured to control an output parameter to smoothly transit from the abnormal parameter value to a rated parameter value, and supply power to the load according to the rated parameter value.

In an embodiment, the output parameter includes an output voltage and an output frequency, the abnormal parameter value includes an abnormal voltage value and an abnormal frequency value, and the rated parameter value includes a rated voltage value and a rated frequency value.

The output control module 504 may include a voltage control unit and a frequency control unit.

The voltage control unit is configured to control the output voltage to smoothly transit from the abnormal voltage value to the rated voltage value in a first preset time period according to a first formula.

The frequency control unit is configured to control the output frequency to smoothly transit from the abnormal frequency value to the rated frequency value in a second preset time period according to a second formula.

Optionally, the first formula is:

$$V = \begin{cases} V_0 + \dfrac{V_{rate} - V_0}{T_0} t & (t \le T_0) \\ V_{rate} & (t > T_0) \end{cases}.$$

$V_0$ is the abnormal voltage value, $V_{rate}$ is the rated voltage value, $T_0$ is the first preset time period, t is a time length from a start time instant of the first preset time period to a current time instant, and V is an output voltage at the current time instant.

Optionally, the second formula is:

$$f = \begin{cases} f_0 + \dfrac{f_{rate} - f_0}{T_1} t & (t \le T_1) \\ f_{rate} & (t > T_1) \end{cases}.$$

$f_0$ is the abnormal frequency value, $f_{rate}$ is the rated frequency value, $T_1$ is the second preset time period, t is a time length from a start time instant of the second preset time period to a current time instant, where the start time instant of the second preset time period is the same as the start time instant of the first preset time period, and f is an output frequency at the current time instant.

Optionally, the power grid parameter includes a power grid voltage and a power grid frequency; and the power grid abnormality determining module 501 is further configured to: determine that the power grid is in an abnormal state if the power grid voltage is outside a preset voltage range or the power grid frequency is outside a preset frequency range, and determine that the power grid is in a normal state if the power grid voltage is within the preset voltage range and the power grid frequency is within the preset frequency range.

Those skilled in the art can clearly understand that for convenience and conciseness of description, the description is made by taking the above divisions of the functional units and modules as an example. In practical application, the above functions may be implemented by different functional units and modules as needed, that is, the internal structure of the system for switching from grid-connected to grid-disconnected is divided into different functional units or modules, to implement all or some of the functions described above. The functional units and modules in the embodiments may be integrated into one processing unit, or each unit may exist independently, or two or more units may be integrated in one unit. The above integrated units may be implemented in a form of hardware, or in a form of software function unit. In addition, naming of the functional units and the modules are only intended to distinguish from each other, rather than limit the scope of protection of the present disclosure. Reference can be made to the corresponding processes in the foregoing method embodiments for the specific operation processes of the units and modules of the apparatus above, which are not described redundantly herein.

Figure 6:
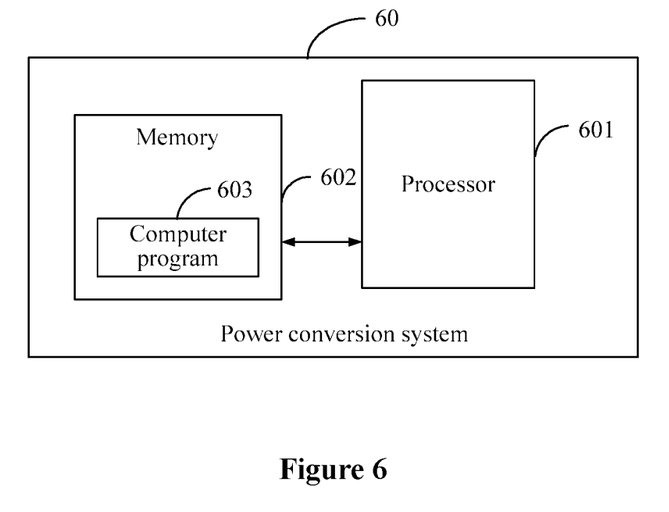
FIG. 6 is a schematic block diagram of a power conversion system according to an embodiment of the present disclosure.

FIG. 6 is a schematic block diagram of a power conversion system according to an embodiment of the present disclosure. As shown in FIG. 6, a power conversion system 60 in the embodiment includes one or more processors 601, a memory 602 and a computer program 603 stored in the memory 602 and capable of running on the processor 601. The processor 601 is configured to execute the computer program 603 to perform steps in the method for switching from grid-connected to grid-disconnected according to the above embodiments, such as steps S101 to S104 shown in FIG. 1. Alternatively, the processor 601 is configured to perform the computer program 603 to implement functions of the modules or units in the system for switching from grid-connected to grid-disconnected according to the above embodiments, such as the functions of the modules 501 to 504 shown in FIG. 5.

Illustratively, the computer program 603 may be divided into one or more modules or units. The one or more modules or units are stored in the memory 602 and executed by the processor 601, to implement the present disclosure. The one or more modules or units may be a series of computer program instruction segments capable of performing specific functions. The computer program instruction segments are used to describe the execution process of the computer program 603 in the power conversion system 60. For example, the computer program 603 may be divided into a power grid abnormality determining module, an abnormal value recording module, a switching module and an output control module, and the functions of the modules are described as follows.

The power grid abnormality determining module is configured to obtain a power grid parameter when the power conversion system is grid-connected and operating in a current source mode, and determine whether the power grid is in an abnormal state based on the power grid parameter.

The abnormal value recording module is configured to record a power grid parameter value at a time instant when the power grid is in an abnormal state as an abnormal parameter value, and send a turn-off command to the switching cabinet, if it is determined that the power grid is in an abnormal state. The turn-off command is used to instruct the switching cabinet to be turned off.

The switching module is configured to switch from the current source mode to a voltage source mode, send a switching command to a grid-connected/grid-disconnected switch, and determine a current loop given value as an initial value of a grid-disconnected loop. The switching command is used to instruct the grid-connected/grid-disconnected switch to switch from a grid-connected loop to the grid-disconnected loop.

The output control module is configured to control an output parameter to smoothly transit from the abnormal parameter value to a rated parameter value, and supply power to the load according to the rated parameter value.

Reference can be made to the description of the embodiment as shown in FIG. 5 for other modules or units, which are not described herein redundantly.

The power conversion system 60 includes, but not limited to, the processors 601 and the memory 602. Those skilled in the art may understand that FIG. 6 is only an example of the power conversion system 60 and does not constitute limitation on the power conversion system 60. The power conversion system 60 may include more or less components than shown in FIG. 6, combinations of some components, or different components. For example, the power conversion system 30 may further include an input device, an output device, a network access device, a bus and the like.

The processors 601 may be a central processing unit (CPU), a general-purpose processor, a digital signal processors (DSP), an application specific integrated circuit (ASIC), a field-programmable gate array (FPGA), any other programmable logic device, a discrete gate, a transistor logic device, a discrete hardware component and the like. The general-purpose processor may be a microprocessor or any regular processor.

The memory 602 may be an internal storage unit of the power conversion system 60, such as a hard disk or an internal memory of the power conversion system 60. The memory 602 may also be an external storage device of the power conversion system 60, such as a plug-in hard disk, a smart media card (SMC), a secure digital (SD) card, and a flash card which are configured for the power conversion system 60. Furthermore, the memory 602 may include both the internal storage unit and the external storage device of the energy storage converter 60. The memory 602 is configured to storage the computer program 603, and other programs and data required by the power conversion system 60. The memory 602 is further configured to temporarily store outputted data or to-be-outputted data.

In the above embodiments, description of each embodiment has a different focus. For parts not detailed or described in some embodiment, references may be made to relevant descriptions in other embodiments.

Those skilled in the art may appreciate that, various exemplary units and algorithm steps described in conjunction with the embodiments disclosed herein can be implemented by electronic hardware or a combination of computer software and electronic hardware. Whether the functions are performed by hardware or software depends on the specific application and design constraint conditions of the technical solutions. Those skilled in the art can use a different method for each application to implement the described function, and such implementation is not considered to be beyond the scope of the present disclosure.

It should be understood that in the embodiments of the present disclosure, the disclosed system and method for switching from grid-connected to grid-disconnected may be implemented in other ways. For example, the embodiments of the system for switching from grid-connected to grid-disconnected are merely exemplary. For example, the division of the modules or units is only a kind of logical function division, and there may be other division modes in practical implementation. For example, multiple units or components may be combined or integrated into another system or some features may be omitted or not implemented. In addition, the displayed or discussed mutual coupling, direct coupling or communication connection may be indirect coupling or communication connection via some interfaces, devices or units, which may be in an electrical form, a mechanical form or other forms.

The units described as independent components may be or may not be physically independent. The components displayed as unit may be or may not be physically units, that is, the components may be arranged in one location or distributed to multiple network units. Some or all of the units may be selected to implement the objective of the technical solution of the embodiment based on actual requirements.

In addition, the functional units in the embodiments of the present disclosure may be integrated into one processing unit, or each unit may exist independently, or two or more units may be integrated into one unit. The above integrated units may be implemented in a form of hardware, or may be implemented in a form of software function unit.

The integrated modules or units may be stored in a computer-readable storage medium in a case that the integrated modules or units are implemented in the form of software function module and sold or used as an independent product. Based on such understanding, the whole or parts of the flow of the method in the above embodiment can be implemented by a computer program instructing related hardware. The computer program may be stored in a computer-readable storage medium. The computer program is executed by the processor to perform steps of the method according the above embodiments. The computer program includes computer program codes. The computer program codes may be in a source code form, an object code form, an executable file form, or in some intermediate form. The computer-readable storage medium may include any entity, device or recording medium capable of storing the computer program codes, such as a U-disk, a portable hard disk, a magnetic disk, an optical disc, a computer memory, a read-only memory (ROM), a random access memory (RAM), an electric carrier signal, a telecommunication signal and a software distribution medium. It should be noted that contents of the computer-readable storage medium may be appropriately increased or reduced according to the requirements of the legislation and patent practice in the jurisdiction. For example, in some jurisdictions, according to the legislation and patent practice, the computer-readable storage medium does not cover the electric carrier signal and the telecommunication signal.

The above embodiments are merely provided for describing the technical solutions of the present disclosure, rather than limiting it. Although the present disclosure is described in detail with reference to the foregoing embodiments, those skilled in the art should understand that they can still modify the technical solutions described in the foregoing embodiments, or make equivalent substitutions to some of the technical features. Such modifications or substitutions do not cause the essence of corresponding technical solutions to depart from the spirit and scope of the technical solutions according to the embodiments of the present disclosure, and shall both fall within the scope of the protection of present disclosure.

The invention claimed is:

1. A method for switching from grid-connected to grid-disconnected, applied to a power conversion system, wherein the power conversion system is connected with a first terminal of a switching cabinet and a load, and a second terminal of the switching cabinet is connected with a power grid, the method for switching from grid-connected to grid-disconnected comprising:
obtaining a power grid parameter when the power conversion system is grid-connected and operating in a current source mode, and determining whether the power grid is in an abnormal state based on the power grid parameter;
recording a power grid parameter value at a time instant when the power grid is in an abnormal state as an abnormal parameter value, and sending a turn-off command to the switching cabinet, in a case that it is determined the power grid is in an abnormal state, wherein the turn-off command is used to instruct the switching cabinet to be turned off;
switching from the current source mode to a voltage source mode, sending a switching command to a grid-connected/grid-disconnected switch, and determining a current loop given value as an initial value of a grid-disconnected loop, wherein the switching command is used to instruct the grid-connected/grid-disconnected switch to switch from a grid-connected loop to the grid-disconnected loop; and
controlling an output parameter to smoothly transit from the abnormal parameter value to a rated parameter value, and supplying power to the load according to the rated parameter value.

2. The method for switching from grid-connected to grid-disconnected according to claim 1, wherein the output parameter comprises an output voltage and an output frequency, the abnormal parameter value comprises an abnormal voltage value and an abnormal frequency value, and the rated parameter value comprises a rated voltage value and a rated frequency value, wherein
the controlling an output parameter to smoothly transit from the abnormal parameter value to a rated parameter value comprises:
controlling the output voltage to smoothly transit from the abnormal voltage value to the rated voltage value in a first preset time period according to a first formula; and
controlling the output frequency to smoothly transit from the abnormal frequency value to the rated frequency value in a second preset time period according to a second formula.

3. The method for switching from grid-connected to grid-disconnected according to claim 2, wherein the first formula is:

$$V = \begin{cases} V_0 + \dfrac{V_{rate} - V_0}{T_0} t & (t \leq T_0), \\ V_{rate} & (t > T_0) \end{cases}$$

wherein $V_0$ is the abnormal voltage value, $V_{rate}$ the rated voltage value, $T_0$ is the first preset time period, t is a time length from a start time instant of the first preset time period to a current time instant, and V is an output voltage at the current time instant.

4. The method for switching from grid-connected to grid-disconnected according to claim 2, wherein the second formula is:

$$f = \begin{cases} f_0 + \dfrac{f_{rate} - f_0}{T_1} t & (t \leq T_1), \\ f_{rate} & (t > T_1) \end{cases}$$

wherein $f_0$ is the abnormal frequency value, $f_{rate}$ is the rated frequency value, $T_1$ is the second preset time period, t is a time length from a start time instant of the second preset time period to a current time instant, the start time instant of the second preset time period being the same as a start time instant of the first preset time period, and f is an output frequency at the current time instant.

5. The method for switching from grid-connected to grid-disconnected according to claim 1, wherein the power grid parameter comprises a power grid voltage and a power grid frequency, and the determining whether the power grid is in an abnormal state based on the power grid parameter comprises:
determining that the power grid is in an abnormal state, in a case that the power grid voltage is outside a preset voltage range or the power grid frequency is outside a preset frequency range; and
determining that the power grid is in a normal state, in a case that the power grid voltage is within the preset voltage range and the power grid frequency is within the preset frequency range.

6. A system for switching from grid-connected to grid-disconnected, applied to a power conversion system, wherein the power conversion system is connected with a first terminal of a switching cabinet and a load, and a second terminal of the switching cabinet is connected with a power grid, the system for switching from grid-connected to grid-disconnected comprising:
a power grid abnormality determining module, configured to obtain a power grid parameter when the power conversion system is grid-connected and operating in a current source mode, and determine whether the power grid is in an abnormal state based on the power grid parameter;
an abnormal value recording module, configured to record a power grid parameter value at a time instant when the power grid is in an abnormal state as an abnormal parameter value, and send a turn-off command to the switching cabinet, in a case that it is determined the power grid is in an abnormal state, wherein the turn-off command is used to instruct the switching cabinet to be turned off;

a switching module, configured to switch from the current source mode to a voltage source mode, send a switching command to a grid-connected/grid-disconnected switch, and determine a current loop given value as an initial value of a grid-disconnected loop, wherein the switching command is used to instruct the grid-connected/grid-disconnected switch to switch from a grid-connected loop to the grid-disconnected loop; and an output control module, configured to control an output parameter to smoothly transit from the abnormal parameter value to a rated parameter value, and supply power to the load according to the rated parameter value.

7. The system for switching from grid-connected to grid-disconnected according to claim 6, wherein the output parameter comprises an output voltage and an output frequency, the abnormal parameter value comprises an abnormal voltage value and an abnormal frequency value, and the rated parameter value comprises a rated voltage value and a rated frequency value, wherein the output control module comprises:
a voltage control unit, configured to control the output voltage to smoothly transit from the abnormal voltage value to the rated voltage value in a first preset time period according to a first formula; and
a frequency control unit, configured to control the output frequency to smoothly transit from the abnormal frequency value to the rated frequency value in a second preset time period according to a second formula.

8. The system for switching from grid-connected to grid-disconnected according to claim 7, wherein the first formula is:

$$V = \begin{cases} V_0 + \dfrac{V_{rate} - V_0}{T_0}t & (t \le T_0) \\ V_{rate} & (t > T_0) \end{cases};$$

wherein $V_0$ is the abnormal voltage value $V_{rate}$ is the rated voltage value, $T_0$ is the first preset time period, t is a time length from a start time instant of the first preset time period to a current time instant, and V is an output voltage at the current time instant.

9. A power conversion system, comprising a memory, a processor and a computer program stored in the memory and capable of running on the processor, wherein the processor is configured to execute the computer program to perform the steps in the method for switching from grid-connected to grid-disconnected according to claim 1.

10. A non-transitory computer-readable storage medium storing a computer program, wherein the computer program is executed by one or more processors to implement the steps in the method for switching from grid-connected to grid-disconnected according to claim 1.

11. The method for switching from grid-connected to grid-disconnected according to claim 2, wherein the power grid parameter comprises a power grid voltage and a power grid frequency, and the determining whether the power grid is in an abnormal state based on the power grid parameter comprises:
determining that the power grid is in an abnormal state, in a case that the power grid voltage is outside a preset voltage range or the power grid frequency is outside a preset frequency range; and
determining that the power grid is in a normal state, in a case that the power grid voltage is within the preset voltage range and the power grid frequency is within the preset frequency range.

12. The method for switching from grid-connected to grid-disconnected according to claim 3, wherein the power grid parameter comprises a power grid voltage and a power grid frequency, and the determining whether the power grid is in an abnormal state based on the power grid parameter comprises:
determining that the power grid is in an abnormal state, in a case that the power grid voltage is outside a preset voltage range or the power grid frequency is outside a preset frequency range; and
determining that the power grid is in a normal state, in a case that the power grid voltage is within the preset voltage range and the power grid frequency is within the preset frequency range.

13. The method for switching from grid-connected to grid-disconnected according to claim 4, wherein the power grid parameter comprises a power grid voltage and a power grid frequency, and the determining whether the power grid is in an abnormal state based on the power grid parameter comprises:
determining that the power grid is in an abnormal state, in a case that the power grid voltage is outside a preset voltage range or the power grid frequency is outside a preset frequency range; and
determining that the power grid is in a normal state, in a case that the power grid voltage is within the preset voltage range and the power grid frequency is within the preset frequency range.

14. The system for switching from grid-connected to grid-disconnected according to claim 7, wherein the second formula is:

$$f = \begin{cases} f_0 + \dfrac{f_{rate} - f_0}{T_1}t & (t \le T_1) \\ f_{rate} & (t > T_1) \end{cases},$$

wherein $f_0$ is the abnormal frequency value, $f_{rate}$ is the rated frequency value, $T_1$ is the second preset time period, t is a time length from a start time instant of the second preset time period to a current time instant, the start time instant of the second preset time period being the same as a start time instant of the first preset time period, and f is an output frequency at the current time instant.

* * * * *